United States Patent

[11] 3,568,570

[72] Inventor Gordon R. Winders
   Lancaster, Ohio
[21] Appl. No. 804,562
[22] Filed Mar. 5, 1969
[45] Patented Mar. 9, 1971
[73] Assignee Diamond Power Specialty Corporation

[54] ANTI-CREEP HYDRAULIC POSITIONING SYSTEM
   8 Claims, 5 Drawing Figs.
[52] U.S. Cl. ..................................................... 91/20,
   91/390, 91/422
[51] Int. Cl. ..................................................... F15b 13/04,
   F01b 25/04
[50] Field of Search ........................................... 91/20, 390

[56] References Cited
UNITED STATES PATENTS
599,618  2/1898  Mason ........................ 91/20

Primary Examiner—Paul E. Maslousky
Attorney—Harness, Dickey and Pierce

ABSTRACT: A hydraulically actuatable piston which is subjected to a constant bias (e.g. gravity) in a direction opposite to that in which it is movable under hydraulic pressure is provided with means for accurately maintaining a stationary piston positioning under hydrostatic pressure despite leakage past the piston by a metering valve actuatable by differential movement between the piston and cylinder, fluid being constantly supplied to the underside of the piston and metered past the valve.

Patented March 9, 1971  3,568,570
2 Sheets-Sheet 1
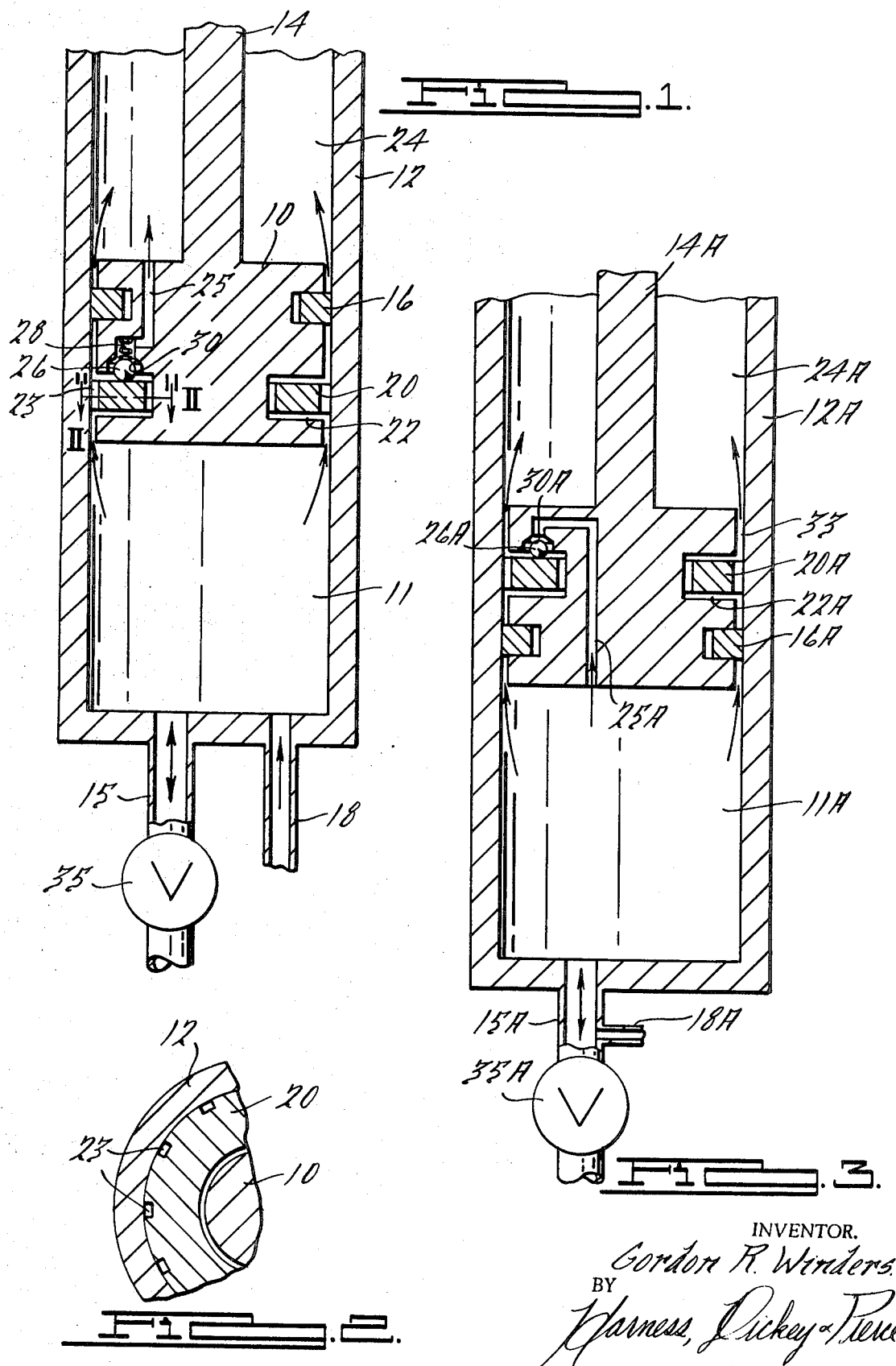

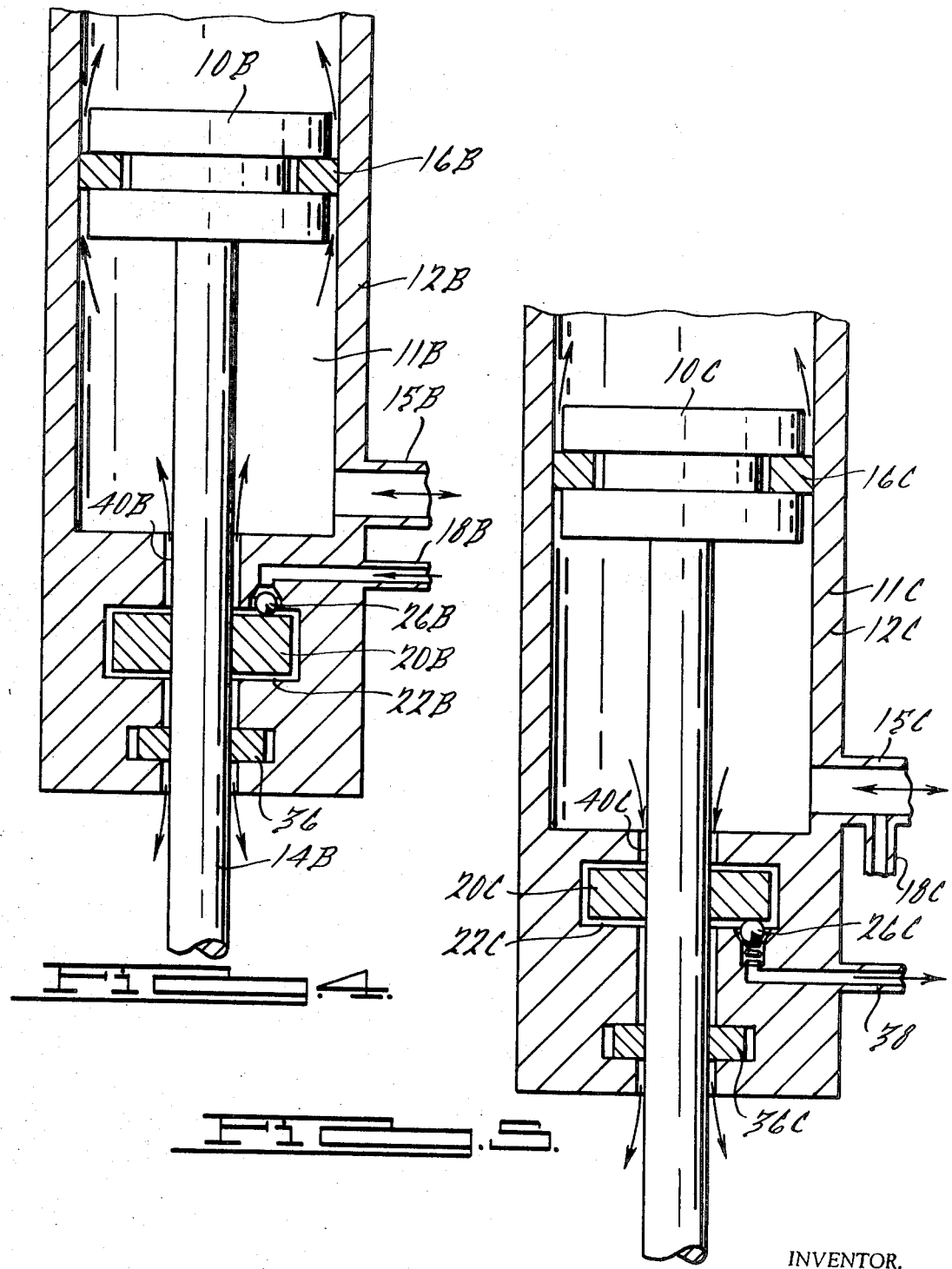

ANTI-CREEP HYDRAULIC POSITIONING SYSTEM

BACKGROUND OF THE INVENTION

Hydraulic servo mechanisms for accurately controlling and varying the position of an object from a remote point by means of hydrostatic pressure are subject to the limitation that some leakage of fluid is unavoidable where a piston and cylinder are employed. Such leakage past the piston has made it difficult or impossible to accurately maintain the position of the piston over an extended period of time. The present invention has as its object the provision of improved inexpensive and reliable means for automatically maintaining the desired positioning of the actuating piston of such a device with great accuracy while nevertheless permitting the piston to be moved under hydraulic pressure when desired to new positions, which will thereafter be similarly accurately maintainable until intentionally changed.

Other objects and advantages will become apparent upon consideration of the present disclosure in its entirety.

BRIEF DESCRIPTION OF THE FIGURES OF DRAWING

FIG. 1 is a somewhat diagrammatic diametric longitudinal section of a preferred form of the invention;

FIG. 2 is a fragmentary detail sectional view taken substantially on the line 2—2 and looking in the direction of the arrows; and FIGS. 3, 4 and 5 are views similar to FIG. 1 showing modified forms of the invention.

DETAILED DESCRIPTION OF THE PREFERRED FORMS OF THE INVENTION

As shown in FIG. 1 a piston 10 is movable in a fixedly supported cylinder 12 to actuate a load (not shown) through the agency of the piston rod 14. A main fluid pressure supply line 15 supplies the fluid which is employed to move the piston upwardly. The piston is gravity-biased downwardly. When it is intended that the piston and load remain stationary, the supply line 15 is tightly closed by suitable valving means as 35 to trap the fluid in the cylinder space 11 below the piston. The piston is provided with a sealing ring 16, and it will be appreciated that a certain amount of leakage past such ring is unavoidable. A second source of fluid supply is introduced into the cylinder below the piston through line 18 when the piston is stationary, at a rate slightly exceeding the leakage past the sealing ring 16.

The piston is also provided with a valve actuating ring 20 which bears frictionally against the cylinder wall with a force which exceeds the force of gravity by an amount which exceeds the force required to move a valve ball 26 which is operated by the ring in a manner to be described. The ring 20 is capable of substantial axial movement in its ring groove 22, and free axial flow of fluid past the ring is permitted through grooves 23, a plurality of which are formed axially on the peripheral surface of the ring.

The space 24 beyond the piston 10 is either vented to atmosphere or connected to a return line (not shown) to return to a reservoir or other desired destination fluid which gets past the piston. The ring groove 22 is connected to the space 24 via a passage 25 in the piston, communication between the ring groove 22 and passage 25 being controlled by a servo valve comprising a ball 26 which is biased by a spring 28 toward an open position in which it projects farther into the ring groove 22. The ball and the seat defined by the enlarged ball chamber 30 are so proportioned and located that the valve when fully closed against its seat, still projects somewhat into the chamber defined by the ring groove 22.

When the main fluid delivery positioning line 15 is sealed in order to maintain the piston in a desired position, fluid is delivered to the space 11 below the piston 10 via the servo line 18 at a fixed flow rate which is in excess of the leakage past sealing ring 16. If under such conditions, due to leakage past the seal 16, the piston tends to fall, the ring 20 maintains itself in position and the valve tends to close as the seat moves toward the valve ball 26. Due to such throttling of the servo fluid the piston is maintained against any substantial descent and is held up far enough to maintain a degree of opening of the valve which just compensates for the leakage past the ring 16.

In the modified forms of the invention shown in FIGS. 3, 4 and 5, many parts will be recognized as analogous to those already described and therefore will require no detailed redescription. They are designated by similar reference characters distinguished by addition of the letters A, B, or C in these respective additional embodiments.

In the embodiment of FIG. 3, the frictionally positioned ring 20A is located between the sealing ring 16A and the escape-return chamber 24A and the servo fluid bypass passage 25A extends from the cylinder pressure chamber 11A to the valve chamber 30A located above and opening into the ring groove 22A in similar fashion. The servo fluid excess which passes the valve is conducted to the escape-return chamber 24A via clearance 33 between the periphery of the piston and the cylinder wall. The servo fluid supply line 18A is connected to the positioning line 15A above the control valve 35A.

In the embodiment of FIG. 4 in which the piston rod 14B extends downwardly for connection to a suspended load (not shown), the servo valve ball 26B is actuated by a disc 20B which is frictionally fitted to the piston rod 14B, and which because of such friction fit is similarly capable of maintaining itself in position with respect to the rod 14B except when the latter is positively moved under hydraulic pressure or by the bias comprising the weight of the load. The axial travel of the disc 20B in its chamber 22B is sufficient to actuate the valve ball 26B between its closed and open positions while still permitting flow of fluid around the disc. The piston 10B is provided with a sealing ring 16B and the piston rod 14B is also sealed with respect to the cylinder 12B by a sealing ring 36.

It will be noted that in this embodiment when the piston 10B tends to fall the downward movement of the disc 20B tends to open the servo valve, which thus admits only enough fluid to compensate for the leakage past the rings 16B, 36. Thus it is not necessary to provide a fixed flow rate in excess of the leakage. When the positioning line 15B is closed to maintain the piston in position, the fluid is admitted via the servo line 18B will merely be sufficient to compensate for the leakages.

The embodiment of FIG. 5 is similar to that of FIG. 4, but resembles the embodiments of FIGS. 1—3 in that a constant supply of fluid exceeding the leakage is delivered via the servo line 18C while the positioning line 15C is sealed, to position the piston and the load, and the excess beyond that required to position the piston and load escapes past the open valve ball 26C to the return passage 38. In the embodiments of FIGS. 4 and 5 fluid conducting clearance is provided at 40B and 40C respectively, between the chamber 22B or 22C and the cylinder space 11B–11C.

This detailed description of preferred forms of the invention, and the accompanying drawings, have been furnished in compliance with the statutory requirement to set forth the best mode contemplated by the inventor of carrying out the invention. The prior portions consisting of the Abstract of the Disclosure and the Background of the Invention are furnished without prejudice in an effort to comply with administrative requirements of the United States Patent Office.

I claim:

1. Hydraulic actuating and positioning means comprising a cylinder part and a piston part, means to deliver fluid to a space in the cylinder on one side of the piston to move the piston, and to trap fluid in such space to substantially immobilize the piston, and means for preventing unwanted movement of the piston when the fluid is trapped, comprising supplemental makeup fluid delivery means connected to said space and having a fluid delivery capacity in excess of the rate of leakage past the piston, and flow control means responsive to relative movement of the piston and cylinder for variably controlling the effective maintenance of makeup fluid in said space in proportion to leakage past the piston as measured by such relative movement, said flow control means comprising a bypass passage past the piston, a valve movable to vary the rate of flow through said passage, and actuating means for the valve comprising a member having limited lost motion connection to the piston and having a friction-slip connection to the cylinder, the frictional resistance of the friction-slip connection exceeding the resistance of said valve to operative movement.

2. Hydraulic actuating and positioning means comprising a cylinder part and a piston part, means to deliver fluid to a space in the cylinder on one side of the piston to move the piston, and to trap fluid in such space to substantially immobilize the piston, and means for preventing unwanted movement of the piston when the fluid is trapped, comprising supplemental makeup fluid delivery means connected to said space and having a fluid delivery capacity in excess of the rate of leakage past the piston, and flow control means responsive to relative movement of the piston and cylinder for variably controlling the effective maintenance of makeup fluid in said space in proportion to leakage past the piston as measured by such relative movement, wherein said flow control means comprises a valve movable to vary said rate of flow and actuating means for the valve comprising a member having a friction-slip connection to one of said parts and a limited lost motion connection to the other part, the frictional resistance of the friction-slip connection exceeding the resistance of said valve to operative movement.

3. Means as defined in claim 2 including an escape passage from said space, said valve being arranged to vary the flow through said passage.

4. Means as defined in claim 3 wherein said escape passage and valve are carried by the piston.

5. Means as defined in claim 4 wherein said member for actuating the valve comprises a piston ring having lost motion connection to the piston and a friction fit in the cylinder.

6. Means as defined in claim 3 wherein the escape passage and valve are carried by the cylinder.

7. Means as defined in claim 6 wherein said member for actuating the valve has a limited lost motion connection to the cylinder and a frictional-slip connection to the piston.

8. Means as defined in claim 2 wherein said valve is in said supplemental fluid delivery means.